United States Patent [19]
Cha

[11] Patent Number: 4,915,131
[45] Date of Patent: Apr. 10, 1990

[54] HILL-HOLDER

[76] Inventor: Ho H. Cha, 533-36 Suyu 2-dong, Dobong-ku, Seoul, Rep. of Korea

[21] Appl. No.: 350,620

[22] Filed: May 10, 1989

[30] Foreign Application Priority Data

Jul. 12, 1988 [KR] Rep. of Korea ............... UM11412

[51] Int. Cl.[4] ..................... F16D 65/24; B60K 41/20
[52] U.S. Cl. ............................... 137/598; 137/599.2; 192/1.33; 251/129.21
[58] Field of Search ............... 251/129.21; 137/598, 137/599.2; 192/1.33

[56] References Cited

U.S. PATENT DOCUMENTS 2,574,821 11/1951 Forman .................... 192/1.33 X
3,592,228 7/1971 Kukuminato et al. ............ 137/598

Primary Examiner—Arnold Rosenthal
Attorney, Agent, or Firm—Fleit, Jacobson, Cohn, Price, Holman & Stern

[57] ABSTRACT

This invention relates to a hill-holder which prevents backward rolling of a vehicle when starting the vehicle on a hill facing upwardly. The hill-holder comprises a solenoid valve assembly having a cylindrical core, in its central portion and a bobbin surrounding the cylindrical core. The cylindrical core has two opposite grooves for communication on its outer surface and comprises a rod having a conical-shaped head. Even when the solenoid valve assembly is energized, it is possible for the fluid pressure to flow from the master cylinder assembly to the wheel cylinder assembly. However, the fluid having passed will not be returned unless the switch for a side brake is off or the clutch pedal is depressed.

1 Claim, 4 Drawing Sheets

HILL-HOLDER

This invention relates to brake control devices for vehicles and more particularly to improved hill-holder.

BACKGROUND OF THE INVENTION

The hill-holder of the present invention operates to relieve a vehicle operator of the precarious driving condition wherein the vehicle is situated on a hill facing upward. The vehicle operator must maintain one foot on the clutch and the other foot on the brake during a stop. When it is desired to drive up the hill, the operator must quickly accelerate with the other foot before the vehicle starts to roll backward down the hill.

For preventing backward rolling of a vehicle, I have proposed the following hill-holder in the Korean Utility Model Application No. 11412.

A valve means is provided in the solenoid assembly which is actuated by a battery. Within the solenoid assembly are provided a core and a rod with a compression spring mounted therewith. Opening for fluid is bored through the center of a piston and valve control ring.

This prior art requires too many components and increases the cost and trouble.

The object of this invention for overcoming such defects, this invention simplifies the construction of the hill-holder.

BRIEF DESCRIPTION OF THE DRAWINGS

The invention will now be described with reference to the accompanying drawings in which.

DESCRIPTION OF THE PREFERRED INVENTION

Figure 1:
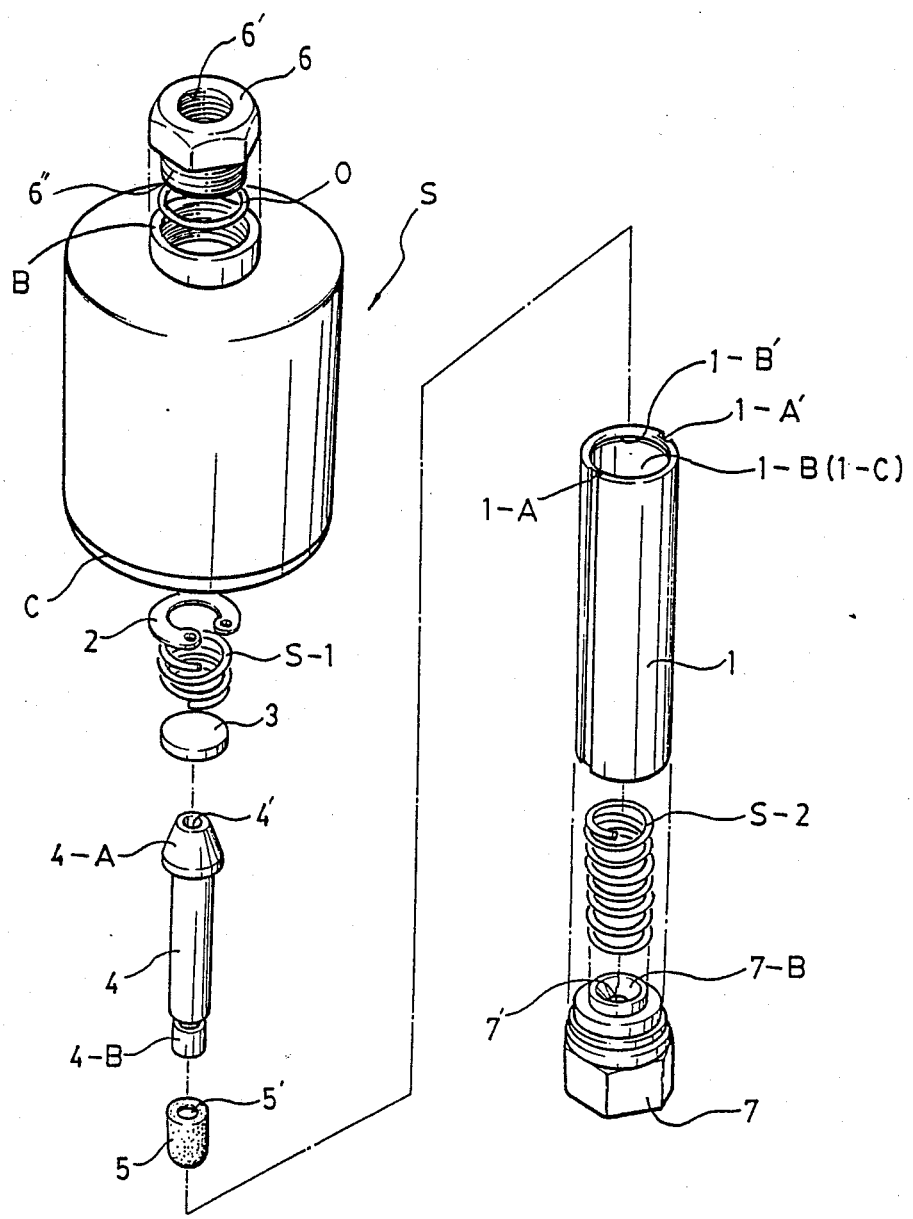
FIG. 1 is an exploded view of the present invention.
Figure 2:
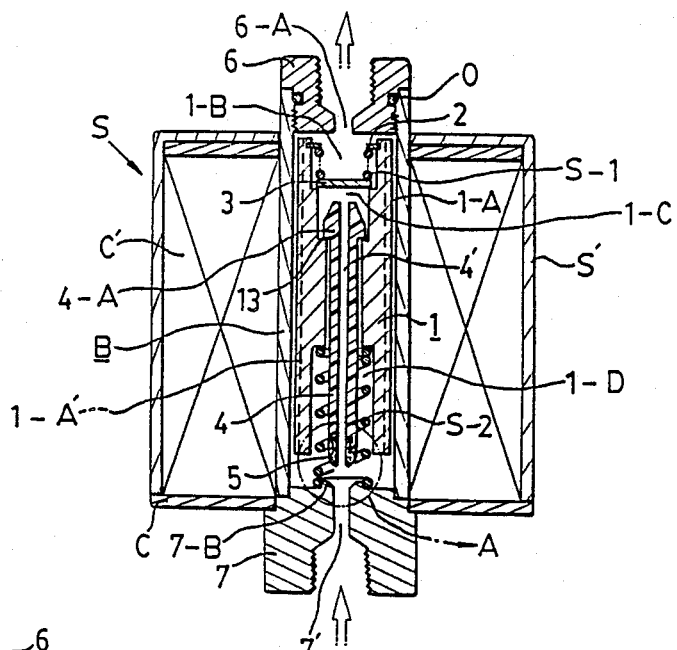
FIG. 2 is a longitudinal cross-sectional view of the hill-holder of the present invention when the vehicle is running or parked.
Figure 3:
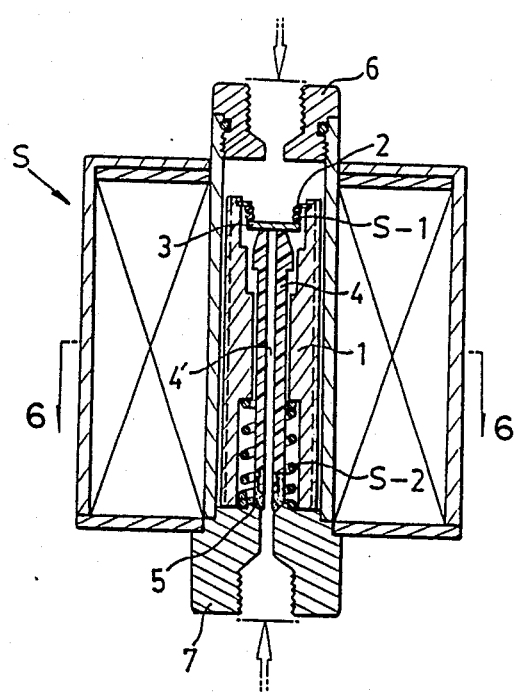
FIG. 3 is a view similar to FIG. 2, but showing running condition of the vehicle with the clutch pedal depressed completely, whereby the inlet is closed completely by actuatuation of the solenoid.
Figure 4:
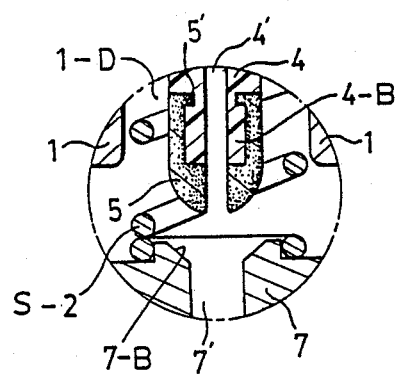
FIG. 4 is an enlarged view of the circular part of FIG. 2.

Referring to the drawings, a solenoid valve assembly S comprises a housing S' and a cylindrical core 1 with a stepped bore 8 therethrough within a bobbin B. The stepped bore 8 defines a small intermediate diameter section 9, an uppermost large diameter section 1-B, an upper diameter section 1-C and a lower large diameter section 1-D. The cylindrical core has two opposite longitudinal grooves 1-A and 1-A' on the outer surface thereof.

Figure 8:
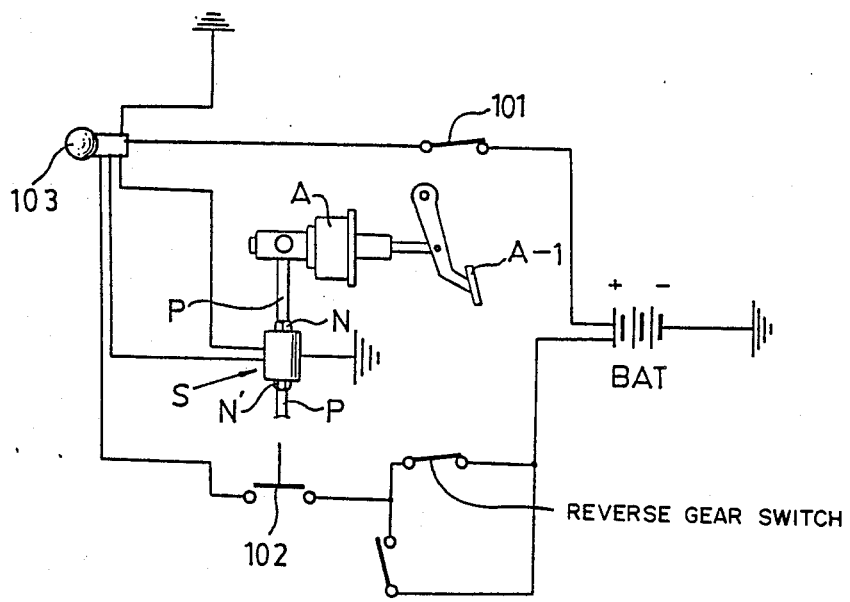

A C-ring 2 retains a spring S-1 within the uppermost large diameter section 1-B. A spring S-2 surrounds a rod 4 within the lower large diameter section 1-D. The spring S-1 urges a valve 3 to engage a conical-shaped valve head 4-A. The valve rod 4 having a central passage 4' for passing fluid is provided in the center of the assembly S. The valve rod 4 has a conical-shaped head 4-A on its top portion and carries a packing valve element 5 for engaging a valve seat 7-B surrounding its lower portion 4-B. A shoulder 5' is provided for engaging the packing valve 5. A nut 6 having a central outlet port 6-A threadably engages the top portion of the bobbin B. The outlet port 6-A is threadably engages the top portion of the bobbin B and tapered at its lower portion. The other nut 7 having a central inlet port 7', is secured to the bobbin 7, and a master plate C. The nut 7 has a protruding valve seat B-B for cooperating with the valve element 5. An exciting coil C' is provided surrounding the bobbin B. A spring S-2 is provided in the lower large diameter section 1-D and seat around the valve seat 7-B. An ring O is provided on the nut 6 and holds it in its place. The nuts 6,7 each threadably engages its respective nipples N', N which are connected to its respective brake oil pipe P. As shown in FIG. 8, one terminal of a battery is connected to the solenoid valve assembly S through a side switch 101 which actuates a lamp 103 and the other terminal of the battery is connected through the low and reverse speed gear and through the clutch-operated switch 102 actuating the lamp 103 to the solenoid valve assembly S, thereby operating the solenoid valve assembly. Once the solenoid valve assembly is energized and the clutch pedal is depressed with the brake pedal A-1 having been depressed, the fluid pressure will be retained. Even after the foot is released from the brake pedal, the solenoid will be energized only by depressing the clutch pedal 10. The solenoid valve assembly when energized will move the cylindrical core 1 downwardly causing the valves 3 and 5 to engage the head 4-A and the valve seat 7-B, respectively, thereby closing the passage 4'. Thereby, only by operating the clutch pedal 10, the brake can be held applied or released. In addition, by using the switch for a side brake 101 the above operation can be achieved. When the switch for the side brake 101 is in switch-off condition for starting the vehicle, the solenoid operation is stopped, whereby the spring S-2 under compression will be returned to its free length, assuming the position of FIG. 5. In this condition only the cylinder 1 moves upwardly until the shoulder of the head 4-A engages a shoulder 13 in the upper middle diameter section causing the valve 5 to disengage from the valve seat 7-B, thereby opening the inlet port 7' release the fluid pressure.

Figure 5:
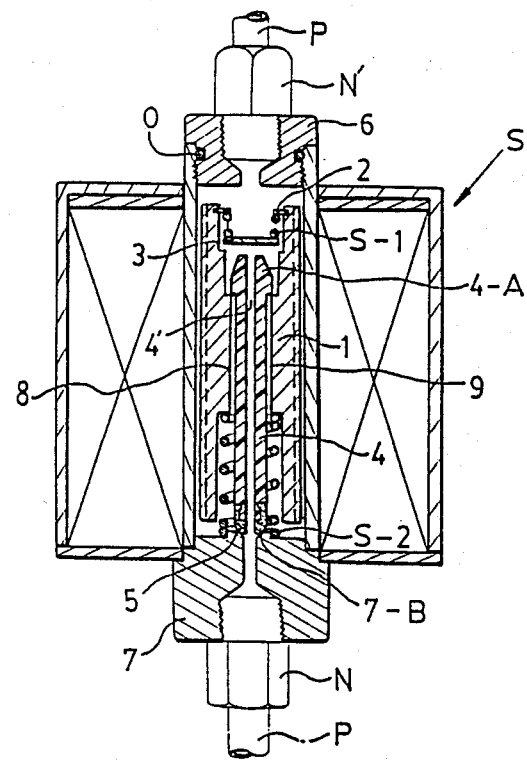
FIG. 5 is a view similar to FIG. 2, but showing the condition when the foot is removed from the clutch pedal whereby the retained fluid is released.
Figure 6:
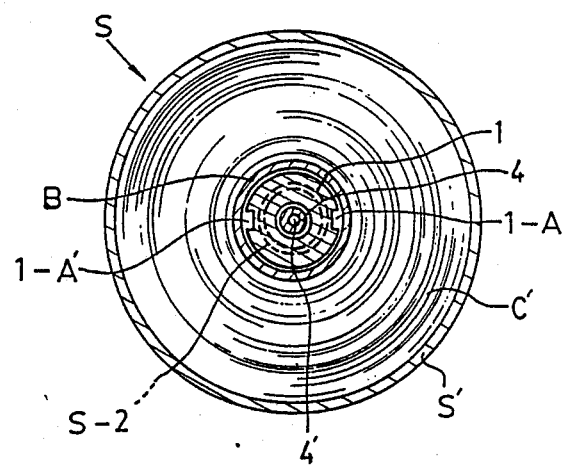
FIG. 6 is a cross-sectional view taken on the lines 6—6 of FIG. 2.
Figure 7:
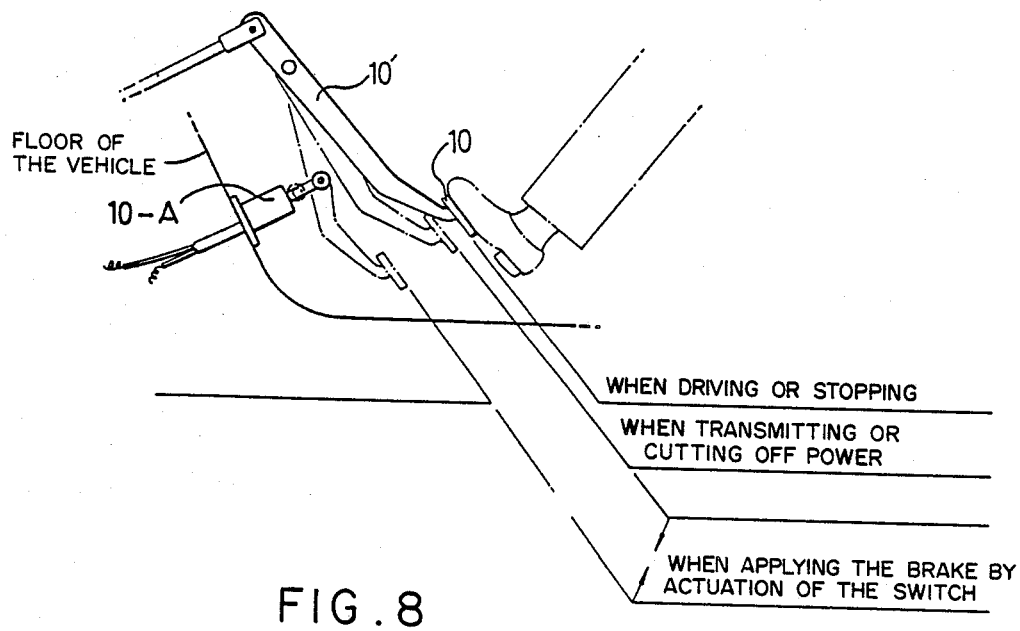
FIG. 7 is a view showing the manner in which the hill-holder of the present invention operates and FIG. 8 is a circuit diagram of the hill-holder of the present invention.

In particular, in FIG. 5 the rod 4 engages the valve seat 7-B but the valve 3 disengages from the rod 4. In this condition, the fluid pressure returns via the narrow passage around the valve 3, the spring S-1 and the outlet port 6-A to the master cylinder device A.

That is, when the side switch 101 is on or the clutch pedal is depressed, the clutch-operating switch 102 actuates the solenoid causing the cylindrical core 1 more downwardly. Consequently, the C-ring 2 pushes the spring S-1 downwardly, thus moving the rod 4 to engage downwardly with the valve seat 7-B. With this operation, the passage 4' is closed by the valve 3. Finally, the packing valve 5 engages the valve seat 7-B, whereby the fluid pressure caused by the depression of the brake pedal A-1 is maintained thus holding the brakes applied.

The above solenoid will always operate when the clutch pedal is depressed or the switch for a side brake is on but the effect is so little as not to effect on the brake operation. In addition, when the passage 4' is closed in the state of operation and if the brake pedal is depressed afterward, considerable fluid pressure transmitted from the master cylinder assembly A lifts the valve 3 thus making no effect on the brake operation.

That is, the vehicle is stopped by depressing the brake pedal A-1, the fluid pressure is maintained within the whole brake system unless the foot is released from the brake pedal. In this condition, if the switch for a side brake is on or the clutch pedal is depressed, the electric power is applied to the solenoid assembly thus preventing the retained fluid pressure from releasing, whereby the brakes will be hold applied. In this condition, the character of the valve 3 is as follows. When the fluid flows from the master cylinder A to the wheel cylinder assembly, the valve is opened for passing the fluid by the force of the spring S-1 thus holding the brakes applied. On the contrary, when the fluid is returned to the master cylinder assembly A from the wheel cylinder assembly, the fluid pressure will further push the valve 3 preventing the return flow unless the foot is released from the clutch pedal.

Accordingly, even when the vehicle is stopped on the hill facing upwardly, the vehicle will not roll backwardly before the vehicle starts. Because when the vehicle is stopped on the hill the operator usually uses among the switch for a side brake the brake pedal A-1 or the clutch pedal. Accordingly, even when the vehicle is stopped on the hill facing upwardly, the operation of the clutch pedal or the switch for a side brake will cause the retained fluid pressure to be maintained continuously by having depressed the brake pedal and in this condition, the solenoid valve assembly is used as an auxiliary brake control device.

Normally, the driver keeps his foot on the brake pedal, uses the side switch 101, or depresses the clutch pedal 10 to hold the brake applied when it is desired to start the vehicle on the side switch will be off or the foot will move from the clutch pedal to the accelerator pedal. In this condition, the clutch has already be in clutch-engaged position. Therefore when the power is transmitted through the propeller shaft and axle shaft to the wheels, the rear surface of the pedal link 10' releases the clutch-operating switch 10-A thereby releasing the terminal of the switch 10-A thus causing the solenoid valve assembly S not to be energized. Accordingly, as shown in FIG. 1 the cylinder 1 moves downwardly causing the springs S-1 and S-2 under compression to have their free length. In this condition, the trapped fluid pressure passes through the center of the C-ring 2 and the surrounding part of the valve 3 causing the brake to be released.

I claim:

1. In a vehicle provided with a clutch mechanism having a solenoid valve assembly, said solenoid valve assembly comprising a housing, an exciting coil, a master plate, a bobbin secured to said master plate, a cylinder having two opposing outer grooves and a valve rod, said cylinder and valve rod having a coaxial passage through or in which the fluid pressure passes or is trapped, said bobbin defining a small intermediate diameter section, a first large diameter section, a middle diameter section and a second large diameter section, said valve rod having a conical-shaped head for engaging a first valve, a central-through passage, a second valve in the bottom thereof for engaging a valve seat formed in a closure nut, a first spring being provided in said first large diameter section, a second spring being provided in said second large diameter section, a C-ring being provided on the upper portion of said bobbin for retaining said first valve within said first large diameter section, and two closure nuts engaging said bobbin.

* * * * *